(12) United States Patent
Seigler et al.

(10) Patent No.: US 9,355,661 B2
(45) Date of Patent: May 31, 2016

(54) INTEGRATED HEAD FOR HEAT ASSISTED MAGNETIC RECORDING

(71) Applicant: Seagate Technology LLC, Cupertino, CA (US)

(72) Inventors: Michael Allen Seigler, Eden Prairie, MN (US); Sharat Batra, Plymouth, MN (US); William Albert Challener, Scotia, NY (US); Hua Zhou, Plymouth, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/853,329

(22) Filed: Sep. 14, 2015

(65) Prior Publication Data
US 2016/0049165 A1 Feb. 18, 2016

Related U.S. Application Data

(63) Continuation of application No. 11/654,471, filed on Jan. 17, 2007, now Pat. No. 9,135,932.

(51) Int. Cl.
*G11B 5/48* (2006.01)
*G11B 5/00* (2006.01)

(52) U.S. Cl.
CPC ........ *G11B 5/484* (2013.01); *G11B 2005/0021* (2013.01)

(58) Field of Classification Search
CPC ........... G11B 2005/0021; G11B 5/314; G11B 5/6088; G11B 5/607; G11B 5/3133; G11B 5/02; G11B 5/4866
USPC .......................................................... 360/59
See application file for complete search history.

(56) References Cited

U.S. PATENT DOCUMENTS

| 6,583,396 | B2 | 6/2003 | Bakx |
| 6,714,370 | B2 | 3/2004 | McDaniel et al. |
| 6,795,630 | B2 | 9/2004 | Challener |
| 7,062,774 | B2 | 6/2006 | Lee |
| 7,236,332 | B2 * | 6/2007 | Stipe .................... G11B 5/1278 360/128 |
| 7,272,079 | B2 * | 9/2007 | Challener .............. B82Y 10/00 360/59 |
| 7,310,205 | B2 * | 12/2007 | Hsu .......................... G11B 5/02 360/317 |
| 7,483,229 | B2 * | 1/2009 | Rausch .................... G11B 5/02 360/128 |
| 2002/0192506 | A1 | 12/2002 | Coffey et al. |
| 2003/0173495 | A1 | 9/2003 | Bakx |
| 2004/0240327 | A1 | 12/2004 | Sendur et al. |
| 2005/0052771 | A1 | 3/2005 | Rausch et al. |
| 2005/0289576 | A1 | 12/2005 | Challener |

(Continued)

FOREIGN PATENT DOCUMENTS

| TW | 476954 | 2/2002 |
| TW | 480356 | 3/2002 |
| WO | WO0159776 | 8/2001 |

OTHER PUBLICATIONS

Challener et al., "Miniature Planar Solid Immersion Mirror with Focused Spot Less Than a Quarter Wavelength" Express, vol. 13, No. 18, Sep. 5, 2005, pp. 7189-7197.

*Primary Examiner* — Mark Blouin
(74) *Attorney, Agent, or Firm* — Hollingsworth Davis, LLC (57) ABSTRACT

A magnetic recording apparatus includes a write element and an optical device for heating a portion of a magnetic medium. The optical device and the write element are arranged to generally prevent the write element from affecting the optical fields generated by the optical device.

20 Claims, 6 Drawing Sheets

(56) References Cited

U.S. PATENT DOCUMENTS

| | | |
|---|---|---|
| 2005/0289577 A1 | 12/2005 | Seigler et al. |
| 2006/0067001 A1 | 3/2006 | Hsu et al. |
| 2006/0119983 A1 | 6/2006 | Rausch et al. |
| 2006/0232869 A1 | 10/2006 | Itagi et al. |
| 2006/0233061 A1 | 10/2006 | Rausch et al. |
| 2007/0230010 A1 | 10/2007 | Jin et al. |
| 2007/0230047 A1 | 10/2007 | Jin et al. |
| 2008/0002298 A1 | 1/2008 | Sluzewski |

* cited by examiner

INTEGRATED HEAD FOR HEAT ASSISTED MAGNETIC RECORDING

CROSS REFERENCE TO RELATED CASES

This is a continuation of U.S. patent application Ser. No. 11/654,471, filed Jan. 17, 2007, now U.S. Pat. No. 9,135,932, which is hereby incorporated by reference in its entirety.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

The present invention relates to magnetic recording, and more particularly to the integration of an optical transducer for heat assisted magnetic recording in a magnetic recording device.

BACKGROUND OF THE INVENTION

As areal densities increase, smaller bit cells are required in the magnetic medium (track width and bit length). However, superparamagnetic instabilities become an issue as the grain volume (i.e., the number of grains in the media per bit cell) of the recording medium is reduced in order to control media noise for high areal density recording. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is absolute temperature. When this inequality is not satisfied, thermal energy demagnetizes the stored bits. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, with available materials the recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium.

Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. HAMR allows for the use of small grain media, which is desirable for recording at increased areal densities, with a larger magnetic anisotropy at room temperature to assure sufficient thermal stability. HAMR can be applied to any type of magnetic storage media, including tilted media, longitudinal media, perpendicular media and patterned media. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information.

Most magnetic recording heads used in magnetic recording systems today are longitudinal magnetic recording heads. However, longitudinal magnetic recording in its conventional form has been projected to suffer from superparamagnetic instabilities at high bit densities. An alternative to longitudinal recording that overcomes at least some of the problems associated with the superparamagnetic effect is perpendicular magnetic recording. Perpendicular magnetic recording is believed to have the capability of extending recording densities well beyond the limits of longitudinal magnetic recording. A magnetic recording head used with a perpendicular magnetic storage medium may include a pair of magnetically coupled poles, including a main write pole having a relatively small bottom surface area and a flux return pole having a larger bottom surface area. A coil having a plurality of turns is located adjacent to the main write pole for inducing a magnetic field between the pole and a soft underlayer of the storage media. The soft underlayer is located below the hard magnetic recording layer of the storage media and enhances the amplitude of the field produced by the main pole. This, in turn, allows the use of storage media with higher coercive force, and consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media.

When applying a heat or light source to the medium, it is desirable to confine the heat or light to the track where writing is taking place and to generate the write field in close proximity to where the medium is heated to accomplish high areal density recording. In addition, for heat assisted magnetic recording (HAMR) one of the technological hurdles to overcome is to provide an optical transducer capable of delivering large amounts of light power to the recording medium confined to spots of, for example, 100 nm or less. Furthermore, because magnetic recording poles are typically made of materials that are strongly absorptive and dissipative at optical frequencies (e.g., FeNi, FeCo, CoNiFe), the design and placement of the magnetic poles relative to the optical transducer are important.

BRIEF SUMMARY OF THE INVENTION

The present invention relates to a magnetic recording apparatus including a write element and an optical device for heating a portion of a magnetic medium. The optical device and the write element are arranged to generally prevent the write element from affecting the optical fields generated at the focus of the optical device.

In another aspect, a magnetic recording device includes a write pole having a main portion and an end portion magnetically coupled to the main portion. A return pole is separated from the end portion of the write pole by a write gap. An optical transducer, which is disposed in the write gap, has a cross-sectional area substantially similar to the cross-sectional area of the end portion.

In a further aspect, a magnetic recording device includes a write pole having a main portion, an intermediate portion, and an end portion that define a medium confronting surface. A return pole is magnetically coupled to the write pole distal from the medium confronting surface and is separated from the end portion by a gap region. An optical transducer is disposed proximate to the write pole. A waveguide is disposed between the optical transducer and the return pole for directing electromagnetic radiation onto the optical transducer.

The above summary of the present invention is not intended to describe each disclosed embodiment or every implementation of the present invention. The figures and the detailed description which follow more particularly exemplify illustrative embodiments.

While some of the above-identified figures set forth one or more embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. It should also be understood that the above-identified figures are not drawn to scale.

DETAILED DESCRIPTION

Figure 1:
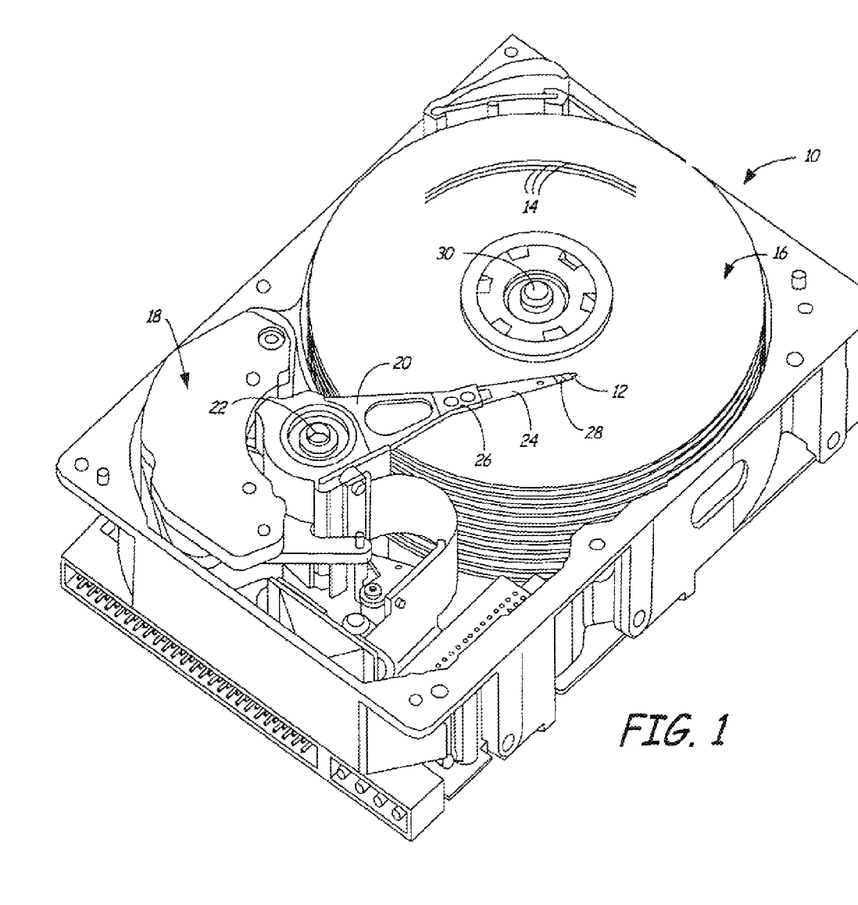
FIG. 1 is a perspective view of a magnetic disc drive that can include magnetic recording devices constructed in accordance with the present invention.

FIG. 1 is a perspective view of a disc drive 10 including an actuation system for positioning slider 12 over track 14 of magnetic medium 16. The particular configuration of disc drive 10 is shown for ease of describing the present invention and is not intended to limit the scope of the present invention in any way. Disc drive 10 includes a voice coil motor (VCM) 18 arranged to rotate an actuator arm 20 on a spindle around an axis 22. A load beam 24 is connected to actuator arm 20 at a head mounting block 26. A suspension 28 is connected to an end of load beam 24 and slider 12 is attached to suspension 28. VCM 18 is regulated by a controller that is not shown in this view and is well known in the art. Magnetic medium 16 rotates around an axis 30, so that windage is encountered by slider 12 to keep it aloft a small distance above the surface of magnetic medium 16. Each track 14 of magnetic medium 16 is formatted with an array of data storage cells for storing data. Slider 12 carries a magnetic transducer (not shown in FIG. 1) for reading and/or writing data on tracks 14 of magnetic medium 16. The magnetic transducer is described in more detail by way of examples illustrated in FIGS. 2-8.

Figure 4:
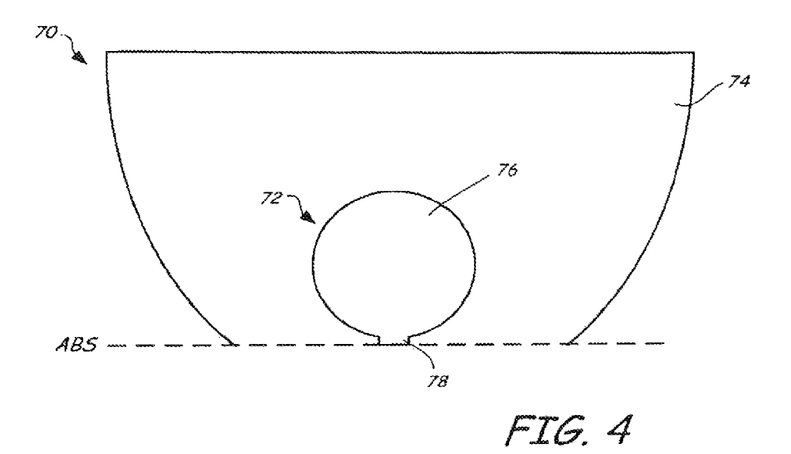
FIG. 4 is a schematic view of an optical device for heating a portion of a magnetic medium.
Figure 5:
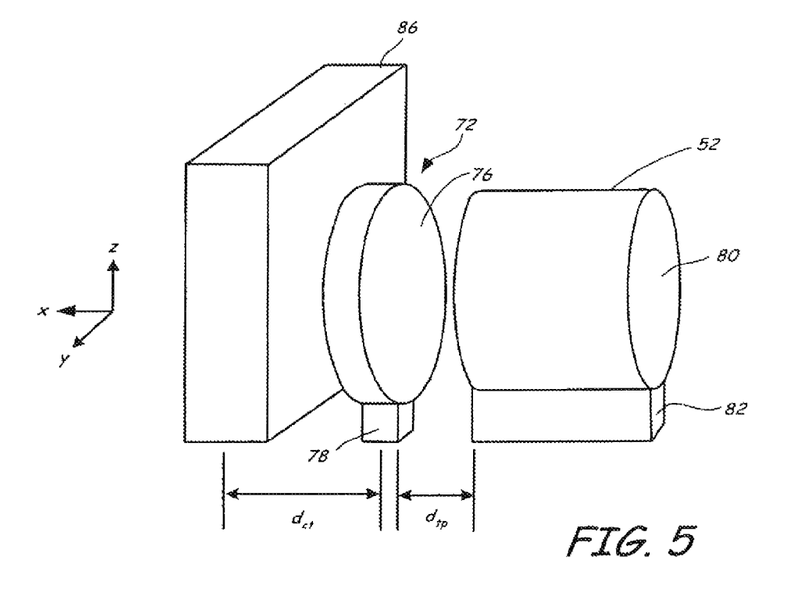
FIG. 5 is a perspective view of an end portion of a write pole, the optical transducer, and a waveguide core.
Figure 6:
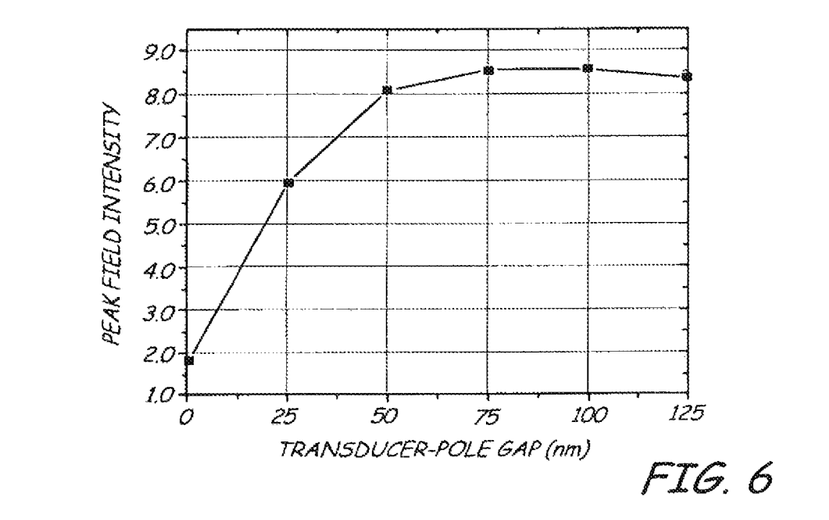
FIG. 6 is a graph showing the peak electric field intensity from the optical transducer for different distances between the optical transducer and the write pole.
Figure 7:
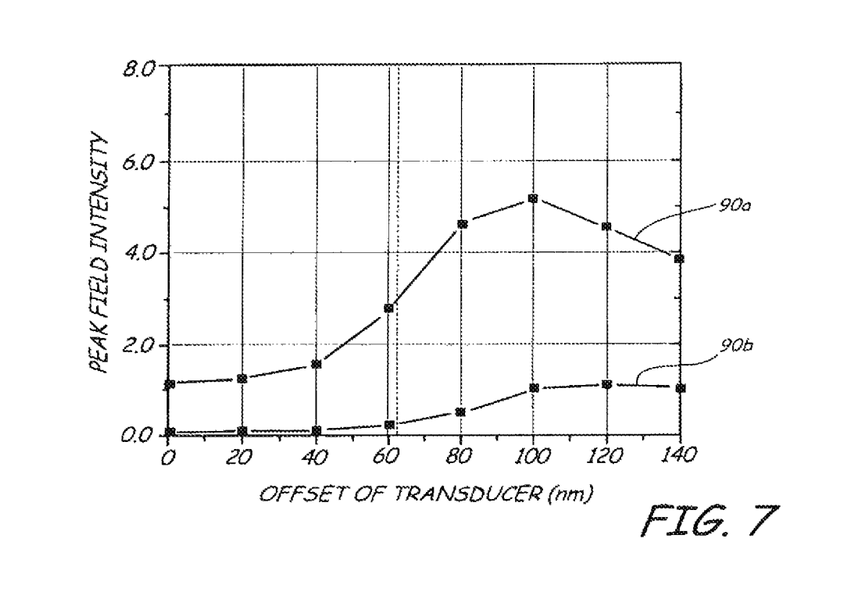
FIG. 7 is a graph showing the peak electric field intensity from the optical transducer as a function of the spacing from a waveguide core of the optical transducer.
Figure 8:
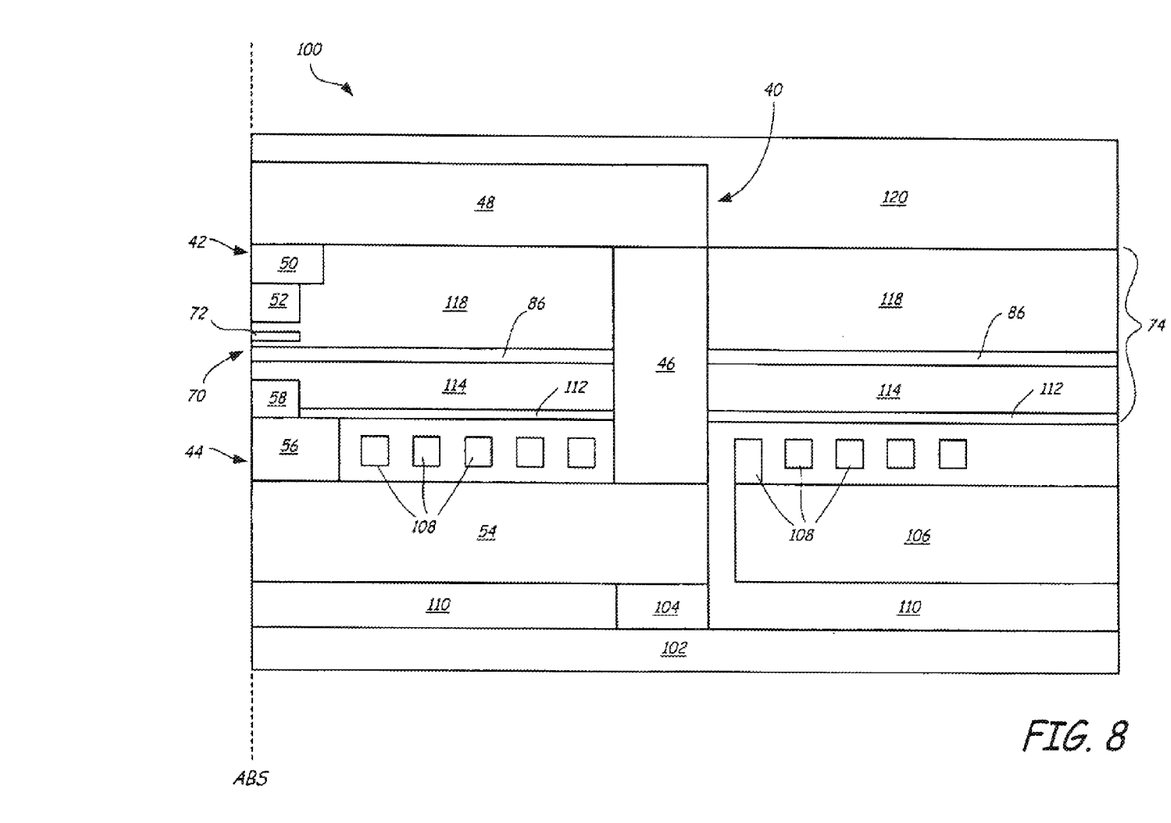
FIG. 8 is a cross-section view of a magnetic recording device including the magnetic writer integrated with an optical transducer for writing to a magnetic medium.

The subject invention is directed to a magnetic recording device including a magnetic writer for generating a magnetic field to write to a magnetic medium (such as magnetic medium 16) and an optical device to heat a portion of the magnetic medium proximate to the write field. In the following description, FIGS. 2A, 2B, and 3 relate to the components and functionality of a magnetic writer suitable for use in the magnetic recording device of the present invention, FIG. 4 relates to the components and functionality of an optical device suitable for use in the magnetic recording device of the present invention, FIGS. 5, 6, and 7 are directed to design considerations for integrating the magnetic writer of FIGS. 2A and 2B with the optical device of FIG. 4, and FIG. 8 shows an integrated magnetic recording device constructed according to the present invention including the magnetic writer and the optical device.

Figure 2A:
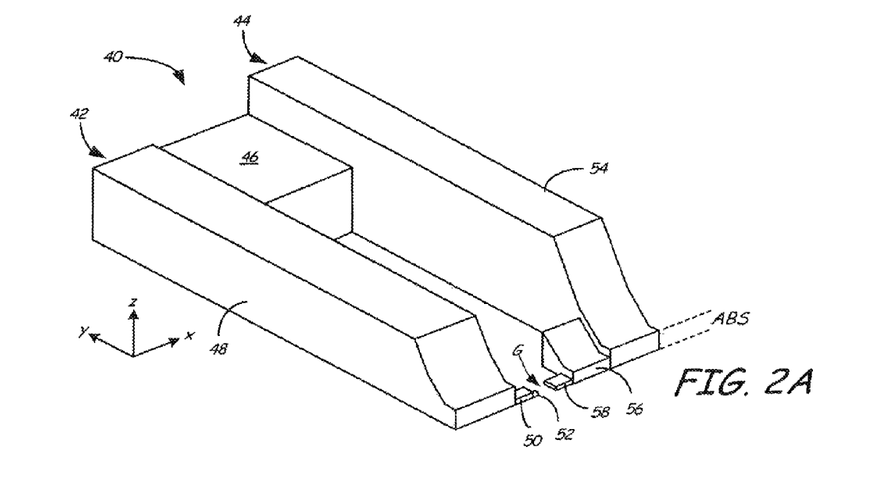
FIG. 2A is a perspective view of a magnetic writer portion of a magnetic recording device.
Figure 2B:
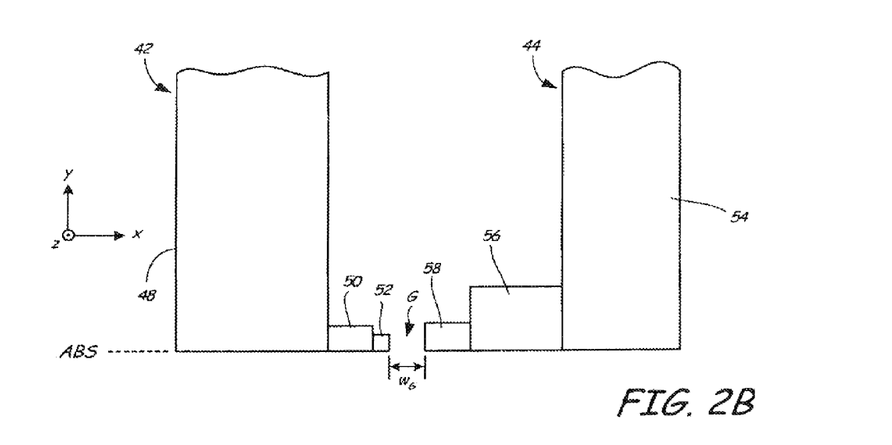
FIG. 2B is a top view of the magnetic writer portion shown in FIG. 2A.

FIG. 2A is a perspective view and FIG. 2B is a top view of magnetic writer 40 including write pole 42 and return pole 44 magnetically coupled by back via 46 distal from an air bearing surface (ABS), which is the medium confronting surface of magnetic writer 40. Write pole 42 includes main portion 48, intermediate portion 50, and end portion 52 having surfaces that define the ABS. Return pole 44 includes main portion 54, intermediate portion 56, and end portion 58. Write pole 42 and return pole 44 are separated by a write gap G having a width $w_G$.

Magnetic writer 40, which is sometimes called a ring head, is shown merely for purposes of illustrating a magnetic writer that is suitable for use in the magnetic recording device of the present invention, and variations on the design may be made. For example, portions of write pole 42 and return pole 44 proximate to the ABS may be made of a different material than the remainder of write pole 42 and return pole 44. In addition, intermediate portion 50 and end portion 52 of write pole 42 may be tapered near the ABS to concentrate the magnetic flux exiting from these components. Furthermore, intermediate portion 56 and end portion 58 of return pole 44 may be eliminated to simplify processing of magnetic writer 40.

Magnetic writer 40 is carried (such as by slider 12 in FIG. 1) over the surface of a magnetic medium (e.g., magnetic medium 16) such that the ABS of magnetic writer 40 faces the surface of the magnetic medium. The magnetic medium is moved relative to magnetic writer 40 such that write pole 42 is the trailing pole of the two poles and is used to physically write data to the magnetic medium. To write data, conductive coils, which are not shown in FIGS. 2A and 2B, surround back via 46. When an electric current is caused to flow through the conductive coils, the magnetomotive force in the coils magnetizes the combined pole structure of magnetic writer 40. This induces a write field in the plane of the magnetic medium across write gap G between write pole 42 and return pole 44, which may be used for longitudinal recording. In addition, the write field developed by write pole 42 and return pole 44 in the magnetic medium near write gap G has a perpendicular component that may be used for perpendicular recording.

Figure 3:
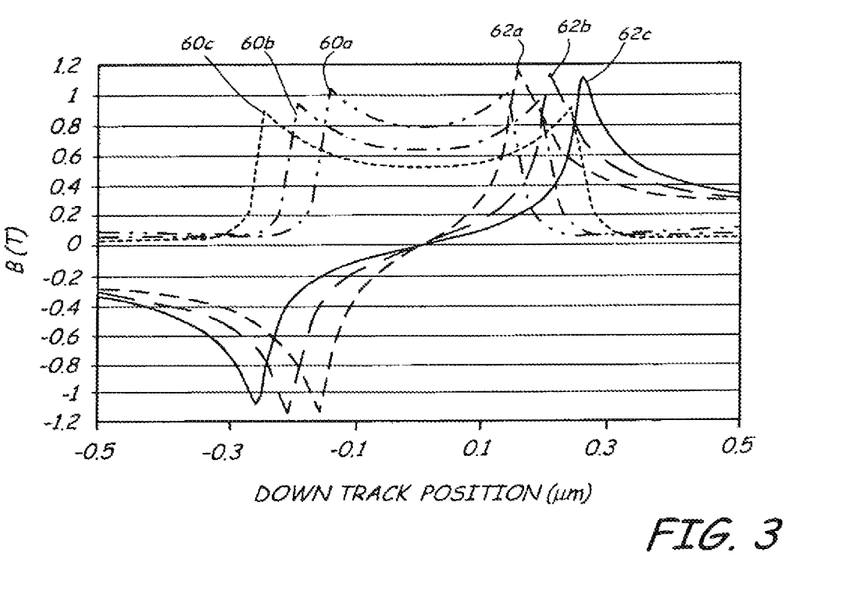
FIG. 3 is a graph showing the perpendicular and longitudinal components of the write field versus the down track position of the magnetic writer of FIGS. 2A and 2B.

FIG. 3 is a graph showing the perpendicular and longitudinal components of write field B(T) versus the down track position of magnetic writer 40 having different gap widths $w_G$. Down track position 0.0 represents the middle of gap G between end portions 52 and 58, with data values in the positive direction representing the perpendicular component of the write field toward write pole 42 and with data values in the negative direction representing the perpendicular component of the write field toward return pole 44. Lines 60a, 60b, and 60c show the longitudinal component and lines 62a, 62b, and 62c show the perpendicular component of the write field B(T) of magnetic writer 40 for gap widths $w_G$ of about 300 nm, 400 nm, and 500 nm, respectively. In all cases, the separation between the ABS and the magnetic medium is about 10 nm. The positive portion of the perpendicular component of write field B(T) points toward write pole 42, while the negative portion of the perpendicular component points toward medium 16. If the direction of the write current is reversed, the longitudinal and perpendicular write field components would be reversed. The perpendicular write field component is strongest for all gap widths $w_G$ underneath end portions 52 and 58, and decreases at locations away from end portions 52 and 58. Thus, as will be described in more detail herein, the medium should be heated as close to write pole 42 as possible to write data to the magnetic medium.

For heat assisted magnetic recording (HAMR), an electromagnetic wave of, for example, infrared, visible, or ultraviolet light is directed onto a surface of a data storage medium to raise the temperature of the localized area of the medium to facilitate switching of the magnetization of the area. FIG. 4 is a schematic view of an optical device 70 for heating a portion of a magnetic medium. Optical device 70 is similar to the device shown and described in co-assigned U.S. Pat. App. Pub. No. 2005/0289576, entitled "Transducer for Heat Assisted Magnetic Recording," which is hereby incorporated by reference. Optical device 70 includes optical transducer 72 and waveguide 74. Optical transducer 72 includes a body section 76 having a substantially disk shape and a peg or tip section 78. Optical transducer 72 may be comprised of metallic materials such as gold, silver, aluminum, and copper. Waveguide 74 is a planar waveguide that may have a parabolic shape, and may be, for example, a planar solid immersion mirror (SIM) or a planar mode index lens. Optical transducer 72 may be embedded in or near the core of waveguide 74. The components of waveguide 74 and the relative positioning of optical transducer relative to waveguide 74 will be described herein.

Electromagnetic radiation in the form of polarized light is directed onto waveguide 74, which may include gratings for coupling incident light into the waveguide. The gratings may be offset such that the coupled light enters waveguide 74 with a 180° phase shift with respect to the coupled light on the opposite side of waveguide 74. The sides of waveguide 74 are shaped such that light is redirected to focus at optical transducer 72. At the focal point, the offset grating causes the electric field of the light to be polarized in the longitudinal direction (not shown), which is along the axis of symmetry of waveguide 74. The longitudinal electric field couples strongly to optical transducer 72 when it is oriented in the same direction. Optical transducer 72 resonates with the incident light and creates extremely large electric fields in the magnetic medium in the vicinity of tip section 78. Optical transducer 72 is positioned adjacent to the magnetic medium such that electromagnetic radiation emitted from tip section 78 of optical transducer 72 can be used to heat a portion of the magnetic medium.

As described above, the medium should be heated by optical transducer 72 as close to write pole 42 as possible to write data to the magnetic medium. For example, optical transducer 72 may be disposed within write gap G close to the leading edge of write pole 42. However, the separation between optical transducer 72 (and in particular tip section 78) and write pole 42 should also be kept as large as possible to maintain high optical efficiency in optical transducer 72. In particular, modeling has shown that the efficiency of the coupling optical power into the recording medium is reduced whenever the lossy metal of poles 42 and 44 (which are strongly absorptive and dissipative at optical frequencies) enters a region of high electric fields generated by the interaction of the incident light with optical transducer 72. These high electric fields typically exist at the gap between the bottom of optical transducer 72 and the magnetic medium, and along the outside edges of optical transducer 72. It has also been found that if the lateral dimensions of write pole 42 (and in particular, end portion 52) are confined to within those of the optical transducer as much as possible, the optical coupling efficiency is improved. It has also been found that the optical efficiency decreases as the width of end portion 52 along write gap G increases. Thus, a magnetic recording device integrating magnetic writer 40 with optical device 70 requires careful selection of parameters to meet optical and magnetic field delivery requirements.

FIG. 5 shows an example design for end portion 52 of write pole 42, which is separated from optical transducer 72 by a distance $d_{tp}$. FIG. 5 also shows waveguide core 86, separated from optical transducer 72 by a distance $d_{ct}$, which will be described in more detail below. In order to maximize both optical and magnetic efficiencies, end portion 52 may have a shape and size substantially similar to or smaller than the shape and size of optical transducer 72. End portion 52 has a main section 80 that may have a rounded or disk cross-section having a diameter that is equal to or less than the diameter of the disk-shaped body portion 76 of optical transducer 72. A rounded main section 80 of end portion 52 allows the cross-sectional area of main section 80 to be maximized (thus increasing the magnetic field generated by write pole 42), while minimizing overlap of main section 80 with the edge of body portion 76 of optical transducer 72. Alternatively, main section 80 may have a rectangular cross-section having a size substantially similar to that of body portion 76 of optical transducer 72 to limit overlap with the edge of body portion 76.

End portion 52 also includes tip section 82 that confronts the magnetic medium and delivers the write field to the magnetic medium. In one embodiment, tip section 82 is wider in the cross-track direction (i.e., the y-direction in FIG. 5) than tip section 78 of optical transducer 72 such that tip section 78 defines the track width of the integrated magnetic recording head. At the same time, tip section 82 is formed to be as narrow in the cross-track width direction as processing requirements permit.

FIG. 6 is a graph showing the peak electric field intensity from optical transducer 72 for different distances $d_{tp}$ between optical transducer 72 and end portion 52. As can be seen, with decreased values for distance $d_{tp}$ (particularly for distances $d_{tp}$ below about 50 nm), end portion 52 has a significant effect on the efficiency of optical transducer 72. As described above, this is caused by the lossy metal of poles 42 and 44 entering the high electric field regions generated by the interaction of the incident light with optical transducer 72. Consequently, in order to provide a sufficient electric field to heat the magnetic medium above its Curie temperature, distance $d_{tp}$ is selected to substantially reduce the interaction of end portion 52 with the optical fields generated by optical transducer 72.

Referring back to FIG. 5, optical transducer 72 may be formed proximate to dielectric core 86 within waveguide 74. Dielectric core 86 may be disposed between two layers of cladding material having a lower refractive index than dielectric core 86. A large difference between the refractive indices of core 86 and the cladding layers is desirable to provide the highest degree of confinement of the light energy within waveguide 74. The thickness of dielectric core 86 also determines the degree of confinement. The distance $d_{ct}$ between the center of dielectric core 86 and the center of optical transducer 72 is also an important design consideration, since the relative arrangement of these two components can also have an effect on the optical efficiency of optical transducer 72. Furthermore, the down-track thickness (in the x-direction in FIG. 5) of optical transducer 72 is minimized, since the efficiency of optical transducer 72 decreases with increasing thickness. In various embodiments, the thickness of optical transducer 72 is less than about 60 nm.

FIG. 7 is a graph showing the peak electric field intensity from optical transducer 72 as a function of the distance $d_{ct}$ between the center of core 86 and the center of optical transducer 72. The core-transducer arrangement modeled included a core 86 having a thickness (in the x-direction in FIG. 5) of about 120 nm and in the presence of magnetic poles 42 and 44. Thus, for a transducer offset of 0 nm, optical transducer 72 was embedded in core 86 and the center of core 86 and the center of optical transducer 72 are aligned. The dotted line indicates the transition between core 86 and the adjacent cladding layer. Lines 90a and 90b show the peak electric field intensity for an optical transducer 72 with body portion 80 having diameters of 250 nm and 500 nm, respectively. As can be seen, the peak field intensity increased significantly when the center of optical transducer 72 was disposed outside of core 86 in the cladding material. The highest optical efficiency for both optical transducers 72 modeled occurred at a distance $d_{ct}$ of between about 100 nm and 120 nm.

In light of the above considerations, FIG. 8 is a cross-section view of a magnetic recording device 100 constructed in accordance with the present invention. In particular, magnetic recording device 100 integrates magnetic writer 40 including write pole 42 and return pole 44 connected by back via 46 distal from the ABS, with optical device 70 including optical transducer 72 and waveguide 74. Also shown in FIG. 8 are substrate 102, heat sink coupling 104, current lead 106, conductive coils 108, insulating material 110, mirror 112, cladding layer 114, core layer 86, cladding layer 118, and insulating material 120.

Magnetic recording device 100 is formed on substrate 102, which may be comprised of AlTiC. Heat sink coupling 104 thermally couples magnetic writer 40 (in particular, return pole 54) to substrate 102. Because substrate 102 is a large thermal mass, it acts as a heat sink that dissipates heat from write pole 42 and return pole 44 that is generated by optical transducer 72.

Current contact 106 connects conductive coils 108 to a current source, which supplies the current to conductive coils 108 to magnetize the combined pole structure of magnetic writer 40. In order to keep topography to a minimum and to keep current contact 106 from affecting the optical efficiency of optical transducer 72, conductive coils 108 may be electrically connected to current contact 106 from the underside of the coil structure, as is shown in FIG. 8. This may be accomplished by forming current contact 106 as a separate structure, or by integrating the current contact 106 with main portion 54 of return pole 44. Insulating material 110 surrounds conductive coils 108, current contact 106 and heat sink 104 to electrically isolate these components with respect to each other.

Waveguide 74 includes mirror 112, cladding layer 114, core 86, and cladding layer 118. Waveguide core 86 can be made of, for example, a high index dielectric core material like $TiO_2$, $Ta_2O_5$, Si, SiN, $ZrO_2$, $HfO_2$, ZnSe, or ZnS, depending on the wavelength and refractive index desired. For example, Si has a very large index of 3.5 at a wavelength of 1550 nm in the near infrared, but it is not transparent to visible light. $Ta_2O_5$ has a lower index of about 2.1, but is transparent throughout the near infrared and visible. Waveguide 72 also contains dielectric cladding layers 114 and 118 on either side of the core. The cladding layers must have a lower refractive index than core layer 86. Preferably the difference in refractive index between the core and cladding should be as large as possible. Air is a suitable dielectric for one side of the cladding. Other dielectrics that could be used as cladding layers include $SiO_2$ with an index of 1.46 and $Al_2O_3$ with an index of about 1.67. In this cross-section view, back via 46 passes through an optically inactive portion of waveguide 74 in that light propagates around back via 46 toward optical transducer 72.

As described above, in order to maximize the amount of light that is incident on optical transducer 72, the light should not be affected by the poles as it approaches optical transducer 72. To accomplish this, main portion 54 and intermediate portion 56 of return pole 44 can be disposed as far from core 86 as possible by making end portion 58 and insulating material 114 between end portion 58 and core 86 thicker (e.g., a combined thickness of greater than 0.5 μm). A smooth metal layer (e.g., Au, Ag, or Al) may be used for mirror 112 to mask the light from optical transducer 72 from conductive coils 108 to prevent scattering of the light. Also, mirror 112 may be positioned more than about 0.4 μm from core 86 to prevent additional optical loss in waveguide 74. In addition, the height of end portion 58 of return pole 44 may be minimized such that light traveling through waveguide 74 does not strike end portion 58 much before reaching optical transducer 72. Similar design constraints may also be applied to intermediate portion 50 or write pole 42 to prevent light from striking intermediate portion 50 before reaching optical transducer 72. Intermediate portion 50 may also have a sloped contour distal from the ABS. Main portion 48 or write pole 42 may be disposed further from core 86 by increasing the thicknesses of intermediate portion 50 and end portion 52, or by increasing the thickness of insulating layer 118 between core 86 and write pole 42.

Other variations may be made on the design of magnetic recording device 100 to improve performance of the device or to simplify processing. For example, a transparent magnetic material may be inserted between end portion 52 and optical transducer 72 to enhance the write field at the heated portion of the magnetic medium. The insertion of this material between end portion 52 and optical transducer 72 increases the magnetic field generated by magnetic recording device 100 without decreasing the optical efficiency of the device. The transparent magnetic material does not need to be a particularly good optical material, and the permeability of the material can be relatively low. Modeling has shown that the perpendicular component of the write field at the magnetic medium is approximately linearly proportional to the saturation magnetization of the transparent magnetic material.

As optical transducer 72 heats the magnetic medium, end portion 52 of write pole 42 may also become hot, which may affect the magnetization of write pole 42 and lower the write field at the heated portion of the magnetic medium. If end portion 52 is heated for an extended period of time, the anisotropy and coercivity may also be negatively affected. To decrease heating of the end portion 52, a material having a low thermal conductivity may also be inserted between end portion 52 and optical transducer 72.

If processing requires a cap and/or seed layer be provided on optical transducer 72, or if such layers are desired, they should be formed as thin as possible to satisfy design constraints (e.g., less than 5 nm).

In an alternative embodiment, optical transducer 72 may be removed completely from the design of magnetic recording device 100. The size of the optical spot that heats the magnetic medium then becomes limited by the diffraction properties of waveguide 74, rather than being defined by the physical dimensions of optical transducer 72. However, this is acceptable for lower areal density applications. If optical transducer 72 is removed, the spacing between end portion 52 and core 86 becomes important, since the write field decays very quickly with increased distance from the edge of end portion 52. However, as described above, it is also important for optical efficiency of waveguide 74 that waveguide core 86 is not too close to write pole 42. In addition, removing optical transducer 72 allows for greater flexibility in designing end portion 52 to increase the write field provided by write pole 42, since write pole 42 does not need to avoid overlapping the high electric fields generated by optical transducer 72. For example, end portion 52 may be tapered toward the ABS to concentrate the magnetic flux at tip section 82.

In summary, the present invention relates to a magnetic recording apparatus including a write element and an optical device for heating a portion of a magnetic medium. The optical device and the write element are arranged to generally prevent the write element from affecting the optical fields generated at the focus of the optical device. The optical device and the write pole may be so arranged by, for example, optimizing the distance between the poles and the optical device, adjusting physical characteristics of the poles and the optical device (e.g., shape and size), and integrating materials that insulate the poles from the optical device. By isolating the magnetic poles from the electric fields generated by the optical device, optical and magnetic efficiency of the recording device are maximized.

Although the present invention has been described with reference to preferred embodiments, workers skilled in the art will recognize that changes may be made in form and detail without departing from the spirit and scope of the invention.

The invention claimed is:

1. An apparatus, comprising:
a write element comprising a write pole having an end portion; and
an optical transducer disposed proximate the end portion the write pole and configured to heat a portion of a magnetic recording medium;
wherein the optical transducer has a cross-sectional shape substantially similar to a cross-sectional shape of the end portion of the write pole, and the end portion of the write pole and an edge of the optical transducer are spaced apart by at least 25 nm.

2. The apparatus of claim 1, wherein the optical transducer has a size substantially similar to a size of the end portion of the write pole.

3. The apparatus of claim 1, wherein:
the optical transducer comprises a body portion and a peg extending from the body portion;
the end portion of the write pole comprises a main section and a tip section extending from the main section; and
the body portion has a cross-sectional shape substantially similar to a cross-sectional shape of the main section.

4. The apparatus of claim 1, wherein:
the optical transducer comprises a body portion and a peg extending from the body portion;
the end portion of the write pole comprises a main section and a tip section extending from the main section; and
the peg has a cross-sectional shape substantially similar to a cross-sectional shape of the tip section.

5. The apparatus of claim 1, wherein:
the optical transducer comprises a body portion and a peg extending from the body portion;
the end portion of the write pole comprises a main section and a tip section extending from the main section;
the body portion has a cross-sectional shape substantially similar to a cross-sectional shape of the main section; and
the peg has a cross-sectional shape substantially similar to a cross-sectional shape of the tip section.

6. The apparatus of claim 1, wherein:
the optical transducer comprises a body portion;
the end portion of the write pole comprises a main section; and
the main section has a cross-sectional shape smaller than a cross-sectional shape of the body portion.

7. The apparatus of claim 1, wherein
the optical transducer comprises a body portion;
the end portion of the write pole comprises a main section; and
each of the body portion and the main section has a disk-shaped cross-section.

8. The apparatus of claim 1, wherein
the optical transducer comprises a body portion;
the end portion of the write pole comprises a main section; and
the main section has a rectangular cross-section.

9. The apparatus of claim 1, further comprising a waveguide comprising a dielectric core, wherein:
the optical transducer is situated between the write pole and the dielectric core; and
a distance between a center of the core and a center of the optical transducer ranges between about 80 and 120 nm.

10. The apparatus of claim 1, wherein:
the optical transducer comprises a body portion and a peg extending from the body portion;
the end portion of the write pole comprises a main section and a tip section extending from the main section; and
the tip section that has a cross-track width greater than a cross-track width of the peg.

11. An apparatus, comprising:
a write element comprising a write pole having an end portion; and
an optical transducer disposed proximate the end portion the write pole and configured to heat a portion of a magnetic recording medium;
wherein the end portion of the write pole and an edge of the optical transducer are spaced apart by at least 25 nm to reduce interaction of the write pole with optical fields generated by the optical transducer.

12. The apparatus of claim 11, wherein the optical transducer has a size substantially similar to a size of the end portion of the write pole.

13. The apparatus of claim 11, wherein:
the optical transducer comprises a body portion and a peg extending from the body portion;
the end portion of the write pole comprises a main section and a tip section extending from the main section; and
the body portion has a cross-sectional shape substantially similar to a cross-sectional shape of the main section.

14. The apparatus of claim 11, wherein:
the optical transducer comprises a body portion and a peg extending from the body portion;

the end portion of the write pole comprises a main section and a tip section extending from the main section; and the peg has a cross-sectional shape substantially similar to a cross-sectional shape of the tip section.

15. The apparatus of claim 11, wherein:

the optical transducer comprises a body portion and a peg extending from the body portion;

the end portion of the write pole comprises a main section and a tip section extending from the main section;

the body portion has a cross-sectional shape substantially similar to a cross-sectional shape of the main section; and the peg has a cross-sectional shape substantially similar to a cross-sectional shape of the tip section.

16. The apparatus of claim 11, wherein:

the optical transducer comprises a body portion;

the end portion of the write pole comprises a main section; and the main section has a cross-sectional shape smaller than a cross-sectional shape of the body portion.

17. The apparatus of claim 11, wherein the optical transducer comprises a body portion;

the end portion of the write pole comprises a main section; and each of the body portion and the main section has a disk-shaped cross-section.

18. The apparatus of claim 11, wherein the optical transducer comprises a body portion;

the end portion of the write pole comprises a main section; and the main section has a rectangular cross-section.

19. The apparatus of claim 11, further comprising a waveguide comprising a dielectric core, wherein:

the optical transducer is situated between the write pole and the dielectric core; and a distance between a center of the core and a center of the optical transducer ranges between about 80 and 120 nm.

20. The apparatus of claim 11, wherein:

the optical transducer comprises a body portion and a peg extending from the body portion;

the end portion of the write pole comprises a main section and a tip section extending from the main section; and the tip section that has a cross-track width greater than a cross-track width of the peg.

* * * * *